US006155056A

United States Patent [19]

Sampath et al.

[11] Patent Number: 6,155,056

[45] Date of Patent: Dec. 5, 2000

[54] COOLING LOUVER FOR ANNULAR GAS TURBINE ENGINE COMBUSTION CHAMBER

[75] Inventors: Parthasarathy Sampath, Mississauga; André Chévrefils, Chateauguay; Denis Leclair, Longueuil; Robert Desroches, Boucherville, all of Canada

[73] Assignee: Pratt & Whitney Canada Corp., Longueuil, Canada

[21] Appl. No.: 09/090,209

[22] Filed: Jun. 4, 1998

[51] Int. Cl.[7] .................... F02C 1/00

[52] U.S. Cl. .................... 60/756

[58] Field of Search .................... 60/756, 757, 740

[56] References Cited

U.S. PATENT DOCUMENTS

| | | | |
|---|---|---|---|
| 2,477,583 | 8/1949 | De Zubay | 60/44 |
| 3,898,797 | 8/1975 | Wood . | |
| 4,204,403 | 5/1980 | Howe . | |
| 4,700,544 | 10/1987 | Fucci | 60/757 |
| 5,307,637 | 5/1994 | Stickles et al. . | |
| 5,479,774 | 1/1996 | Burnell et al. | 60/39.36 |

FOREIGN PATENT DOCUMENTS

| | | |
|---|---|---|
| 723413 | 2/1955 | United Kingdom . |

*Primary Examiner*—Timothy S. Thorpe
*Assistant Examiner*—Ehud Gartenberg
*Attorney, Agent, or Firm*—Jeffrey W. Astle

[57] ABSTRACT

The invention provides in a gas turbine engine combustion chamber, an array of elongate louver strips between fuel nozzles of a combustion chamber dome wall, to cool the dome wall and contain combustion gases in the area between nozzles. The elongate louver strips are each disposed symmetrically along the median line on the inner surface dome wall and extend between each nozzle cup of the annular array. Each strip includes an elongate flange extending into the combustion chamber from the inner dome wall. The flange has an inner surface, and lateral side walls, with the inner surface generally parallel to the inner surface of the dome wall. Compressed air outlets are disposed along each flange lateral side wall, for directing a compressed air film along the inner surface of the dome wall in a direction away from the median line. A compressed air inlet extends from the outer surface of the dome wall to the outlets.

6 Claims, 8 Drawing Sheets

COOLING LOUVER FOR ANNULAR GAS TURBINE ENGINE COMBUSTION CHAMBER

TECHNICAL FIELD

The invention is directed to elongate louver strips, placed in a circumferential array in the spaces between fuel nozzles in the dome wall of an annular gas turbine engine combustion chamber, to efficiently cool the dome wall and contain combustion gases in the area between nozzles.

BACKGROUND OF THE ART

The general construction and operation of combustion chambers in gas turbine engines is considered to be well known to those skilled in the art. The present invention relates to annular and reverse flow annular combustion chambers primarily which include an annular dome wall with an array of spaced apart fuel nozzles projecting through the dome wall. Within the combustion chamber, fuel fed through the fuel nozzle is mixed with compressed air provided from a high pressure compressor and ignited to drive turbines with the hot gases emitted from the combustion chamber.

Within the metal combustion chamber, the gases burn at temperatures up to 3,500 to 4,000 degrees Fahrenheit. The combustion chamber is fabricated of metal which can resist extremely high temperatures, however, even highly resistant metal will oxidize and melt at approximately 2,100 to 2,200 degrees Fahrenheit. As is well known to those skilled in the art, the combustion gases are prevented from directly contacting the metal of the combustion chamber through use of cool compressed air films which line the walls of the combustion chamber. The combustion chamber has a number of louver openings through which compressed air is fed parallel to the combustion chamber walls. Eventually the cool air curtain degrades and is mixed with the combustion gases. Spacing of louvers and cool air curtain flow volumes are critical features of the design of a gas turbine engine combustion chamber.

Around the nozzles themselves, fuel is generally fed through a central conduit and atomized or sprayed into the combustion chamber through a number of orifices in the nozzle. Compressed air is fed around the nozzle itself through a nozzle cup. The nozzle cup is mounted within the combustion chamber dome wall and conducts cold compressed air from an outer surface of the dome wall around the nozzles and into the interior the combustion chamber.

In order to cool the metal of the nozzle cup itself and adjacent areas of the dome wall, as well as preventing contact with combustion gases, a portion of the flow entering the nozzle cup is fed around the edges of the cup and radially redirected with an annular flange to radiate in a direction from the centre of the nozzle parallel to the dome wall. As a result a further cooling air curtain is formed radiating outwardly in a direction from the centre of the nozzle over the inner surface of the dome wall.

When fuel nozzles are spaced relatively closely together around the periphery of the annular dome wall, the area of the dome wall between nozzles receives sufficient cooling air flow from the nozzle cups to prevent contact with the hot combustion gases and protect the metal of the dome wall between nozzles. Conventional designs also include extending the flange around the nozzles in a circumferential direction. By extending the flanges of the nozzle cup, it is possible to direct a cooling flow of air a further distance. As a result, the extension of flanges allows spacing of the nozzles to be relatively further apart.

Therefore, in summary the dome wall portion of the combustion chamber is generally cooled in conventional designs merely by providing cooling air curtain radiating from the centre of the nozzles. In some cases the flanges of the nozzle cups are extended to form an oblong shape thereby extending the flow of cooling air to the area of the dome wall between the nozzles.

This conventional design of fuel nozzles and fuel nozzle cups has several disadvantages. Fuel nozzles and cups are an expensive component which must be regularly changed and inspected to preserve engine efficiency. Stated briefly, the more nozzles in an engine, the more expensive the construction and maintenance becomes. Therefore, the natural desire of designers is to use as few fuel nozzles and nozzle cups as possible. However, due to the need for efficient mixing of fuel and combustion within the combustion chamber, annular combustion chambers generally require several nozzles disposed circumferentially about the chamber.

The conventional method of cooling the dome wall between nozzles is to extend the flanges of the fuel nozzles cups to redirect cooling air flow over these areas. It has been found however, that the fuel nozzle cups tend to deteriorate rapidly. Regular maintenance and inspection is required to ensure that the nozzle cup flanges remain operable. This method of cooling often also results in some local areas of the dome wall not being efficiently cooled and hence suffer deterioration and burnout during operation.

In addition, the lengthening of nozzle cup flanges into an oblong shape demands high volumes of cooling air to provide sufficient cooling and air curtain flow for these areas. The high cooling air volume can reduce efficiency of combustion by introducing air for cooling where that air may not be required for most efficient combustion, and also placing a higher demand for compressed air. Optimization of combustion chamber performance would require that the compressed air is introduced into the combustion chamber in optimum amounts and at optimum location when introduced. Conventional cooling systems for the nozzle cups however, introduce relatively high volumes of air needed for cooling in areas of the combustion chamber which may or may not be optimum for combustion.

It is an object of the invention to provide an improved cooling air curtain within the dome wall portion of the combustion chamber to optimize cooling and to optimize combustion by providing the optimum volume and distribution of air within the chemical reaction zone of the combustion chamber.

It is a further object of the invention to reduce maintenance costs and time taken to maintain the fuel nozzles and fuel nozzle cups of an annular combustion chamber through improved cooling of the nozzle area of the dome wall.

It is a further object of the invention to enable use of a simple and small circular fuel nozzle cups in contrast with oblong flanged conventional cups, in order to simplify manufacturing and reduce the overall cost of fuel nozzle cups which must be frequently replaced during routine maintenance.

DISCLOSURE OF THE INVENTION

The invention provides an array of elongate louver strips between fuel nozzles of a combustion chamber dome wall, to cool the dome wall and contain combustion gases in the area between nozzles.

Conventionally an annular gas turbine engine combustion chamber has a dome wall including an annular array of spaced apart fuel nozzles projecting therethrough. A centre point of each nozzle is disposed on a circular median line of the annular dome wall, and a like array of annular nozzle cups is used for ducting cool compressed air from the outer surface of the dome wall into a cooling compressed air film in contact with the inner surface of the dome wall. Like air films radiate in a direction outwardly from the centre point of each nozzle. The nozzle cups usually take the form of an annular cup encircling each nozzle and mounted through the dome wall. Other conventional designs are arranged to cool the area between nozzles with a multitude of small jets passing through the dome wall, which can cause local disturbances to flows and combustion thereby creating local carboning and metal distress.

The elongate louver strips are each disposed symmetrically along the median line on the inner surface dome wall and extend between each nozzle cup of the annular array.

Each louvre strip includes an elongate flange extending into the combustion chamber from the inner dome wall. The flange has an inner surface, and lateral side walls, with the inner surface generally parallel to the inner surface of the dome wall. The construction of the elongated flanges are integrated with the flanges of the nozzle cups so as to provide a structurally integral dome construction. Compressed air outlets are disposed along each strip flange lateral side wall, for directing a compressed air film along the inner surface of the dome wall in a direction away from the median line. A compressed air inlet extends from the outer surface of the dome wall to the outlets. In a preferred embodiment the compressed air inlet comprises two back-to-back elongate accumulation chambers each in exclusive communication with one of the compressed air outlets. The air inlet has a series of inlet orifices extending between each accumulation chamber and the outer surface of the dome wall.

Flange cooling jets are disposed along the inner surface of the flange, for directing a flow of cooling air over the flange inner surface. The air jets are also provided compressed cooling air by the compressed air inlet. Preferably the flange cooling jets comprise a row of scoops aligned along the median line, each with an inlet bore communicating between the scoop and the outer surface of the dome wall. It is also possible to cool the flange without scoops by angularly directing the cooling jets over the surface exposed to hot combustion gases.

The invention allows freedom to the designer to space apart fuel nozzles without the impediment of also providing for cooling air between nozzles. The use of double louver strips enables the use of simple circular nozzle cups to cool the fuel nozzle and elongate louver strips between nozzles to cool the adjacent dome wall areas independently of the nozzles. Repair of the louver strips involves simply removing the scoop row device and welding a new device without changing the flange inside the combustion chamber. Circular nozzle cups are less costly to manufacture and replace during maintenance than conventional oblong flanged cups. The efficiency of cooling the dome is much improved and the need to use excess cooling air to cool local areas of the dome is avoided.

The double louver strips enable the designer to fine tune the local cooling requirements for the nozzle cups and dome wall independently. Introduction of cooling air can be optimised for cooling and tailored to the requirements of efficient combustion. All intake air within the engine is used either for the primary function of combustion or the auxiliary cooling and dilution functions. It follows that by reducing the proportion of total volume of compressed air required for cooling, a higher proportion of compressed air is available for mixing during combustion. Conventional nozzle cups require relatively large volumes of cooling air for cooling the cup flanges and the adjacent dome wall, which does not result in optimally efficient combustion.

Further details of the invention and its advantages will be apparent from the detailed description and drawings included below.

BRIEF DESCRIPTION OF THE DRAWINGS

In order that the invention may be readily understood, one preferred embodiment of the invention will be described by way of example, with reference to the accompanying drawings wherein.

DETAILED DESCRIPTION OF PREFERRED EMBODIMENTS

Figure 1:
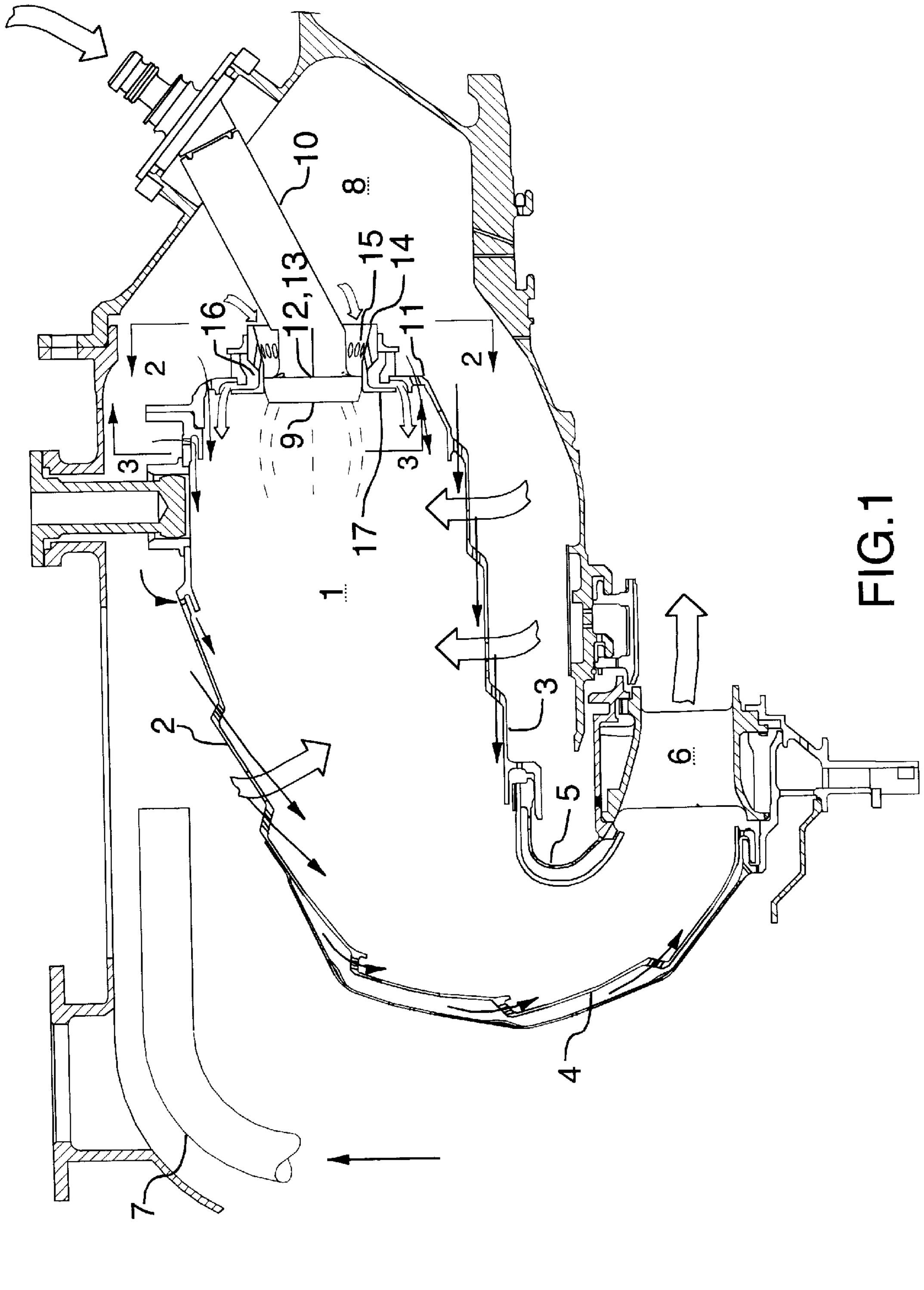
FIG. 1 is an axial cross-sectional view through a gas turbine engine combustion chamber showing (towards the left) a diffuser pipe for conducting compressed air from the engines compressor section into a plenum surrounding the reverse flow annular combustion chamber, and (to the right) a fuel nozzle and surrounding annular nozzle cup projecting through the dome wall of the combustion chamber.

FIG. 1 illustrates a reverse flow annular combustion chamber arrangement which will be briefly described. The combustion chamber 1 is defined within walls 2 and 3 leading to large exit duct 4 and small exit duct 5 which direct the hot combustion gases past a turbine stator 6. Cold compressed air is fed from a rotary impeller (not shown) through a series of diffuser pipes 7 into a compressed air plenum 8 which completely surrounds the annular combustion chamber 1. Liquid fuel is fed to the nozzles 9 through tubes 10.

Figure 2:
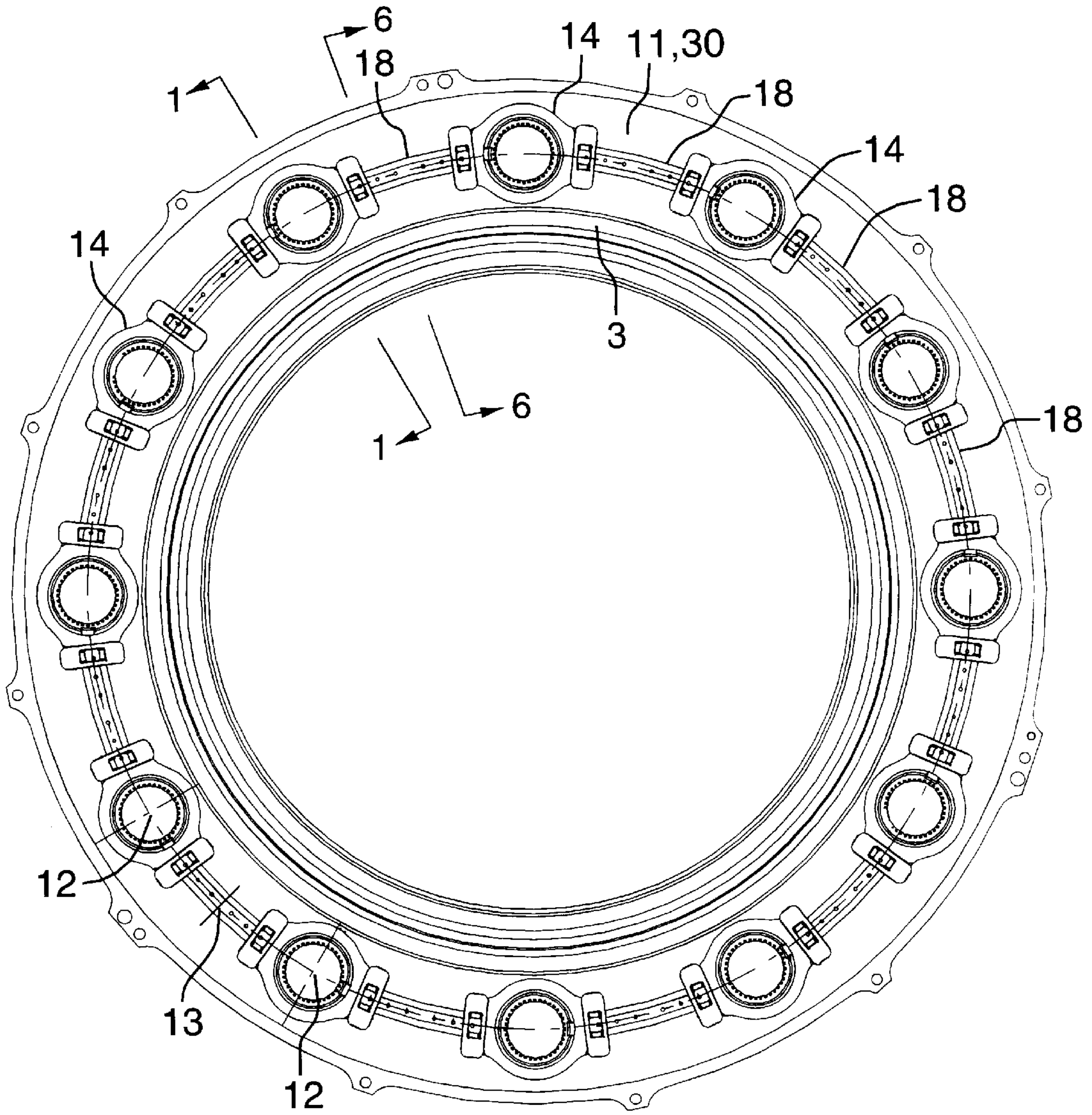
FIG. 2 shows a radial sectional view along the line 2—2 in FIG. 1 showing the combustion chamber dome wall and inner side wall up to the expansion joint in the small exit duct (with nozzles omitted for clarity).

Referring also to FIG. 2 in conjunction with FIG. 1, the combustion chamber 1 has at its rearward end a dome wall 11. The dome wall 11 includes an annular array of spaced apart fuel nozzles 9 (not shown in FIG. 2 for clarity) projecting therethrough. A centre point of each nozzle 12 is disposed on a circular median line 13. As shown in FIG. 1, the nozzles 9 are disposed within annular nozzle cups 14 which encircle each nozzle 9 and mount them through the dome wall 11. As indicated in FIG. 1 with arrows, the compressed air housed within the plenum 8 is all ducted through openings in the nozzles cups 14, openings in the combustion chambers walls 2 and 3, and in the large exit duct 4. The compressed air forms a curtain of cooling air between the hot combustion gases and the metal components of the combustion chamber 1 and provides air to mix with the fuel for efficient combustion as well as to mix downstream with combustion products.

Turning to the immediate area around the nozzle cups 14, it can be seen in FIG. 1 that air from the plenum 8 enters within the nozzle cups 14 and is primarily conducted axially past the nozzle 9 to mix with the atomized fuel spray. In addition the nozzle cups 14 include a circumferential array of openings 15 which bleed a portion of the compressed air from the cup 14. Openings 15 conduct air through a cooling duct 16 and between the inner surface of the dome wall 11 and the nozzle cup flange 17. The result of flow between the inner surface of the dome wall 11 and the nozzle cup flange 17 is a compressed cooling air curtain radiating from the centre point 12 of each nozzle 9. The array of annular nozzle cups 14 therefore, ducts cool compressed air from an outer dome wall 30 into a cooling compressed air film in contact with the inner surface 20 of the dome wall 11 immediately adjacent to the nozzle 9.

Figure 3:
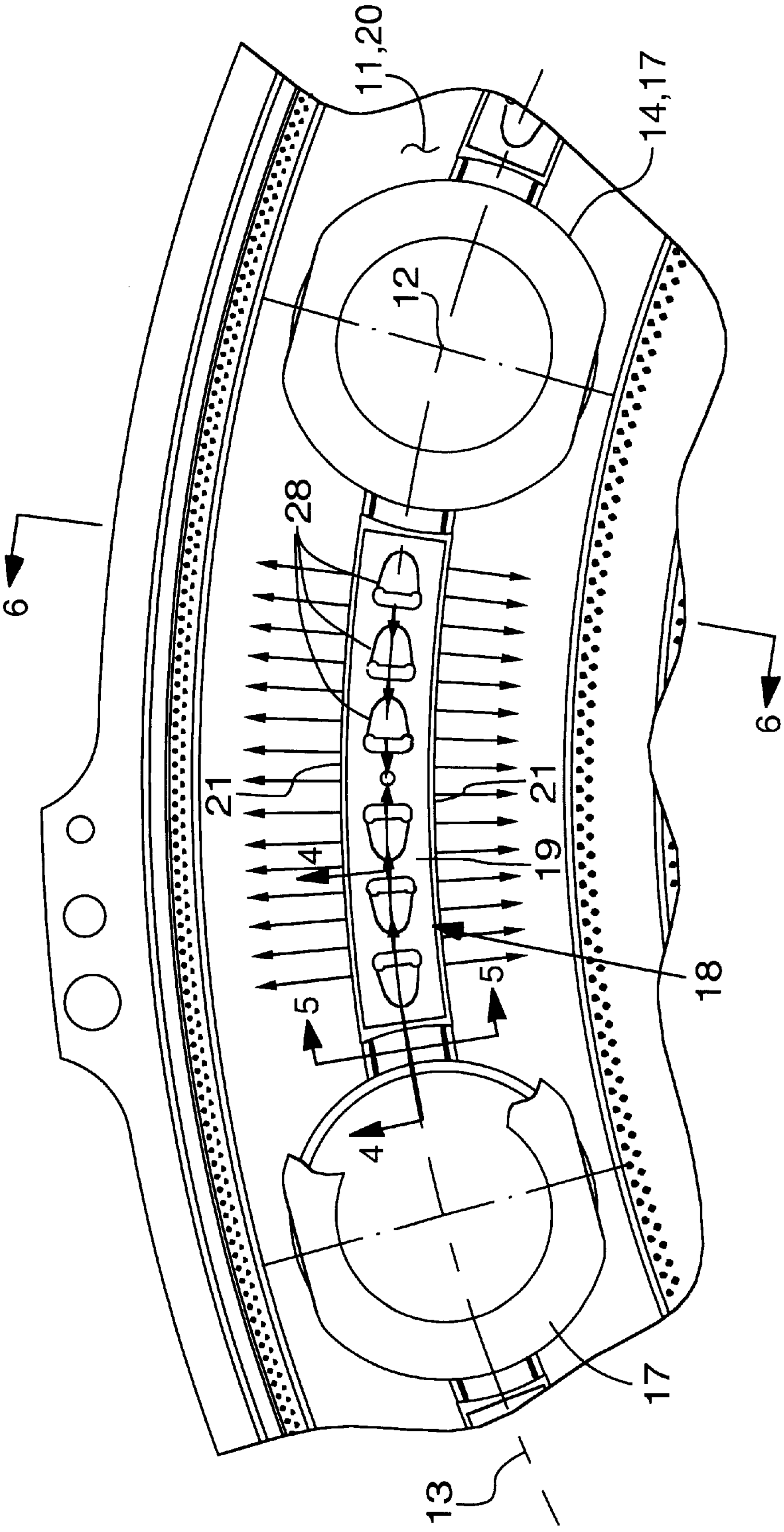
FIG. 3 is a partial radial sectional view along lines 3—3 in FIG. 1 showing a detail of a portion of the dome wall between two fuel nozzle cups.

Referring to FIGS. 2 and 3, the invention is directed to an array of elongate louver strips 18 which provide a cooling curtain of air between the nozzles 9 on the combustion chamber dome wall 11. The louver strips 18 enable spacing of the nozzles 9 and the design of the nozzle cup flanges 17 to be independent of the requirement for cooling of the dome wall 11 between nozzles. The double louvres of louvre strips 18 also provide for uniform cooling in either side of the median line 13 along the dome of the combustor.

FIG. 2 shows the inlet side of the louver strips 18, whereas FIG. 3 shows the outlet side on the interior of the combustion chamber 1. Each elongate louver strip 18 is disposed symmetrically along the median line 13 on the inner surface 20 of the dome wall 11 and extends between each nozzle cup 14.

Figure 6:
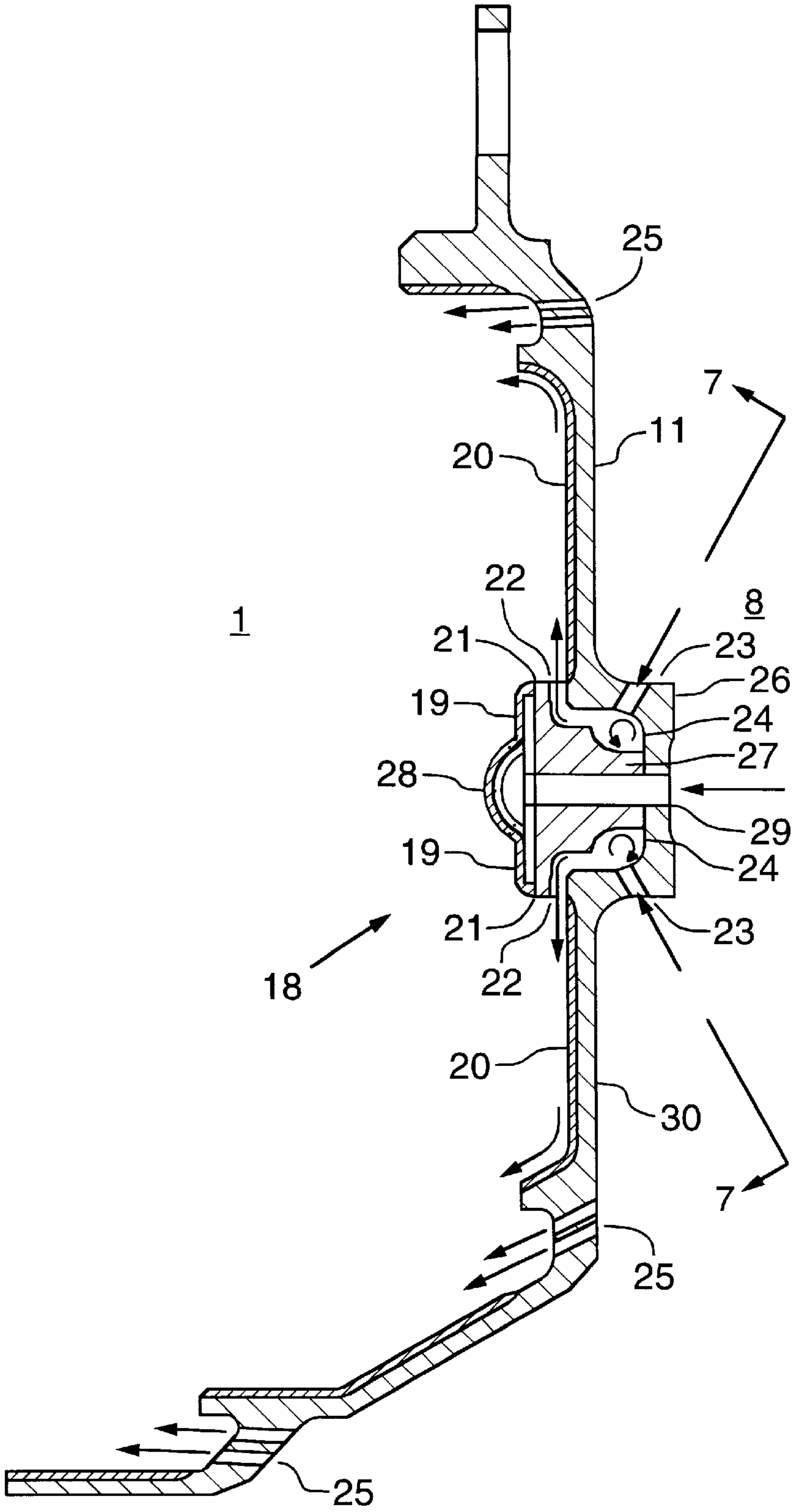
FIG. 6 is an axial sectional view through the dome wall of the combustion chamber and louver strip installed therein along lines 6—6 of FIG. 3.
Figure 7:
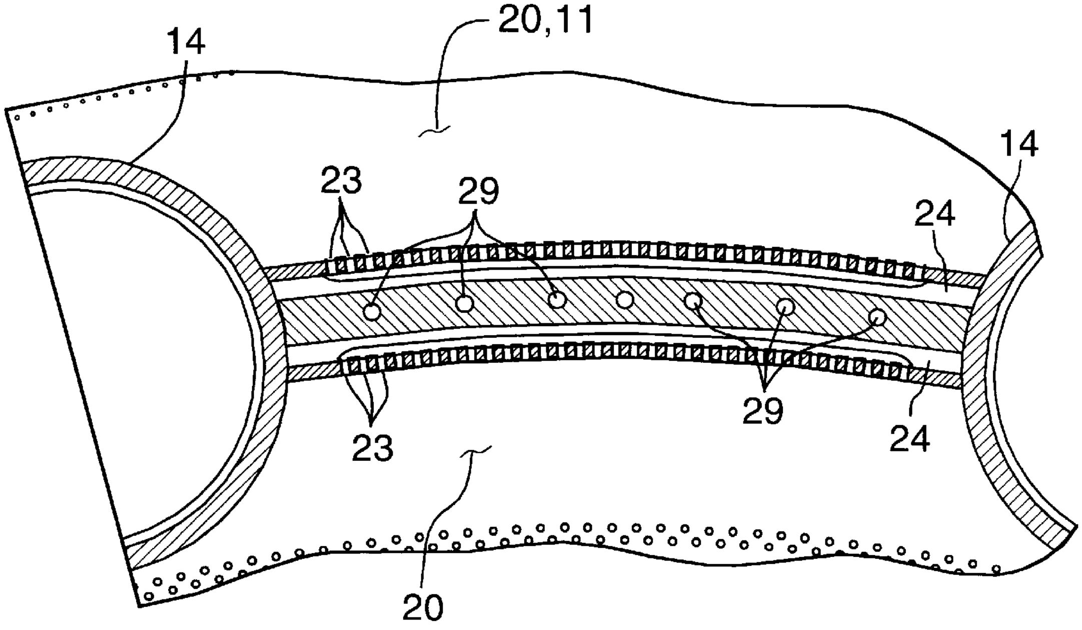
FIG. 7 is a generally radial sectional view along lines 7—7 of FIG. 6 showing the rows of compressed air inlet orifices, the back to back air accumulation chambers, as well as axial inlet bores feeding compressed air to the six scoops on the inner surface of the louver strip flange.

Referring to FIGS. 6 and 3, the louver strip 18 has an elongate flange 19 which extends into the combustion chamber 1 a distance from the inner dome wall 20. Disposed along each lateral side wall 21 of the louver strip flange 19, are compressed air outlets 22 which direct a compressed air film along the inner surface 20 of the dome wall 11 in a direction away from the median line 13. As shown in FIGS. 6 and 7, a row of inlet orifices 23 in the outer dome wall 30 conducts air to the outlets 22 via two back to back elongate accumulation chambers 24. The compressed air inlet orifices 23 extend between the accumulation chambers 24 and the outer dome wall 30. In the embodiment shown in the drawings, each back to back elongate accumulation chamber 24 is in exclusive communication with one of the compressed air outlets 22. The accumulation chamber 24 has a generally lens or egg shaped cross-section in order to induce the inlet air to mix and swirl within the accumulation chamber 24 to emit a uniform curtain of cooling air exiting from the outlets 22 parallel to the inner dome wall 20.

Openings 25 in the dome wall 11 emit a layer of cooling air outwardly from the louver 18 into which the cooling air flow from the louver 18 merges and continues through the combustion chamber 1.

In the preferred embodiment illustrated, the louver strip 18 comprises a recessed trough 26 in the inner surface 20 of the dome wall 11. The compressed air inlet orifices 23 form air inlet passages into the trough 26 lateral sides and extend to the outer dome wall 30. A T-shaped insert is formed of a transverse web 27 with a inner edge connected to the flange 19 of the louver strip 18. An outer edge of the transverse web 27 is braised or welded to the bottom surface of the trough 26 to form the back to back elongate compressed air accumulation chambers 24. Two lateral grooves are machined in the web 27 and arcuate channels are machined to join these grooves to the compressed air outlets 22.

Since the louver strip flange 19 is a relatively large area exposed to the hot combustion gases adjacent to the nozzles 9, it is necessary to provide some cooling flow of air across the inner or top surface of the flange 19. Accordingly, the invention provides flange cooling jets disposed along the inner surface of the flange 19 for directing a flow of cooling air over the flange inner surface 19, with the air jets in communication with a compressed air inlet from the outer side of the dome wall 11.

Figure 4:
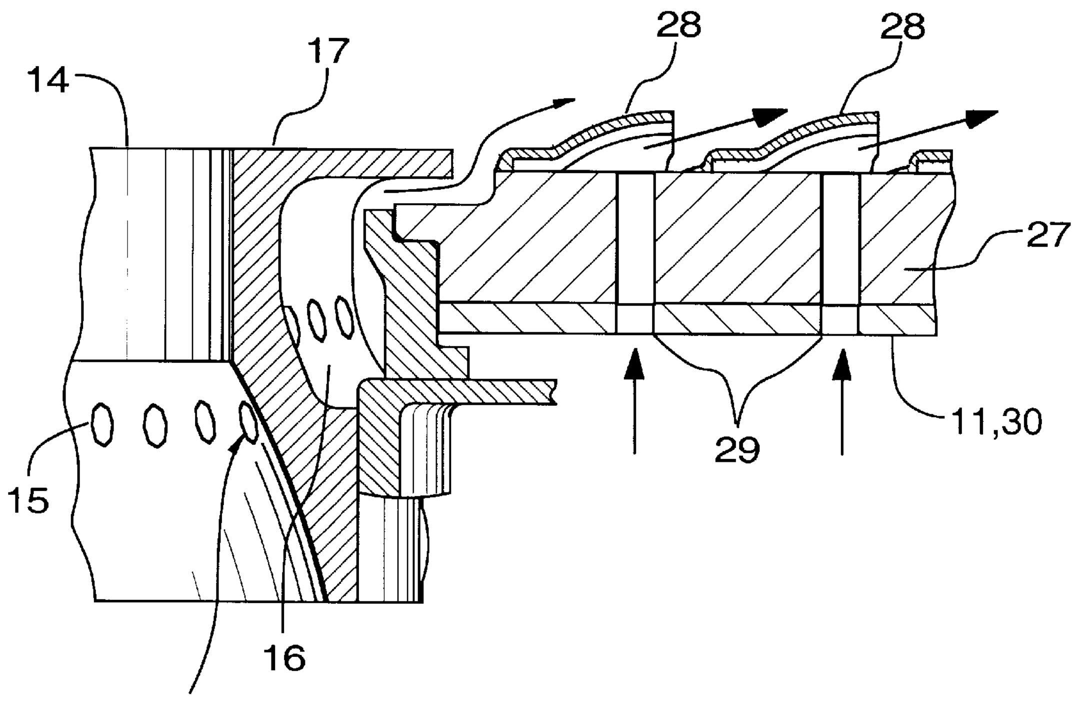
FIG. 4 is a radially outward sectional detail along lines 4—4 of FIG. 3 showing a section through the louver strip and nozzle cup along the median line defined as a circle through the centres of the array of fuel nozzles.
Figure 5:
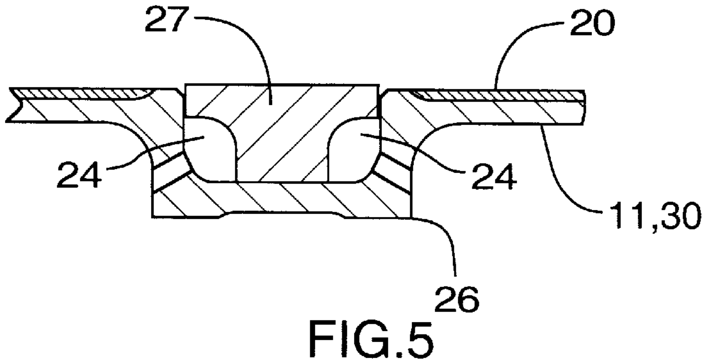
FIG. 5 is an axial sectional view along lines 5—5 of FIG. 3 through the end of the louver strip.

As shown most clearly in FIGS. 4 and 3, flange cooling jets are provided with six scoops 28. Each scoop is provided with an air inlet bore 29 which communicates between each scoop 28 and the outer dome wall 30. As best shown in FIGS. 3 and 4, each scoop 28 has an opening to direct air flow towards a mid-point in the median line 13 between adjacent nozzles 9.

Therefore, as in FIG. 4, the flow radiating from the underside of the nozzle cup flange 17 flows over the top surface of the scoops 28 and merges with the flow from the scoops 28 directed towards a point midway between the nozzles on the median line 13. Flow of air exiting laterally from the louver strips 18 flows from the compressed air outlets 22 along the inner surface 20 of the dome wall 11 and merges with the conventional flow provided through openings 25.

As a result, the flow exiting from compressed air outlets 22 cools and shields the dome wall 11 between nozzles 9, and the scoops 28 on the inner surface of the louver strip flange 19 ensures adequate cooling of the inner top surface of the louver strip flange 19 which is otherwise exposed to the hot combustion gases within the combustion chamber 1.

Figure 8:
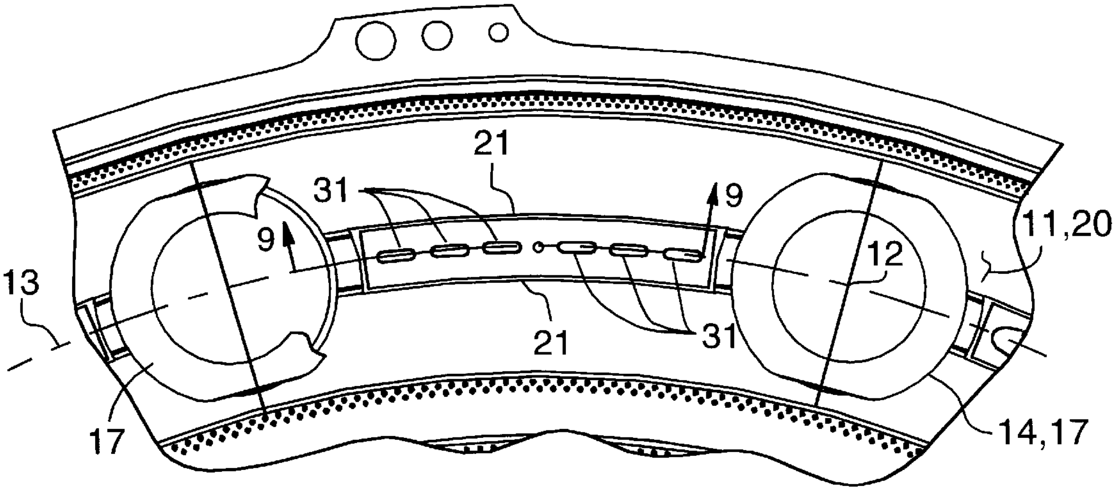
FIG. 8 shows an alternative embodiment where the double louvre flange is cooled with angularly directed effusion cooling bores without flange cooling scoops as in the embodiment of FIG. 3.
Figure 9:
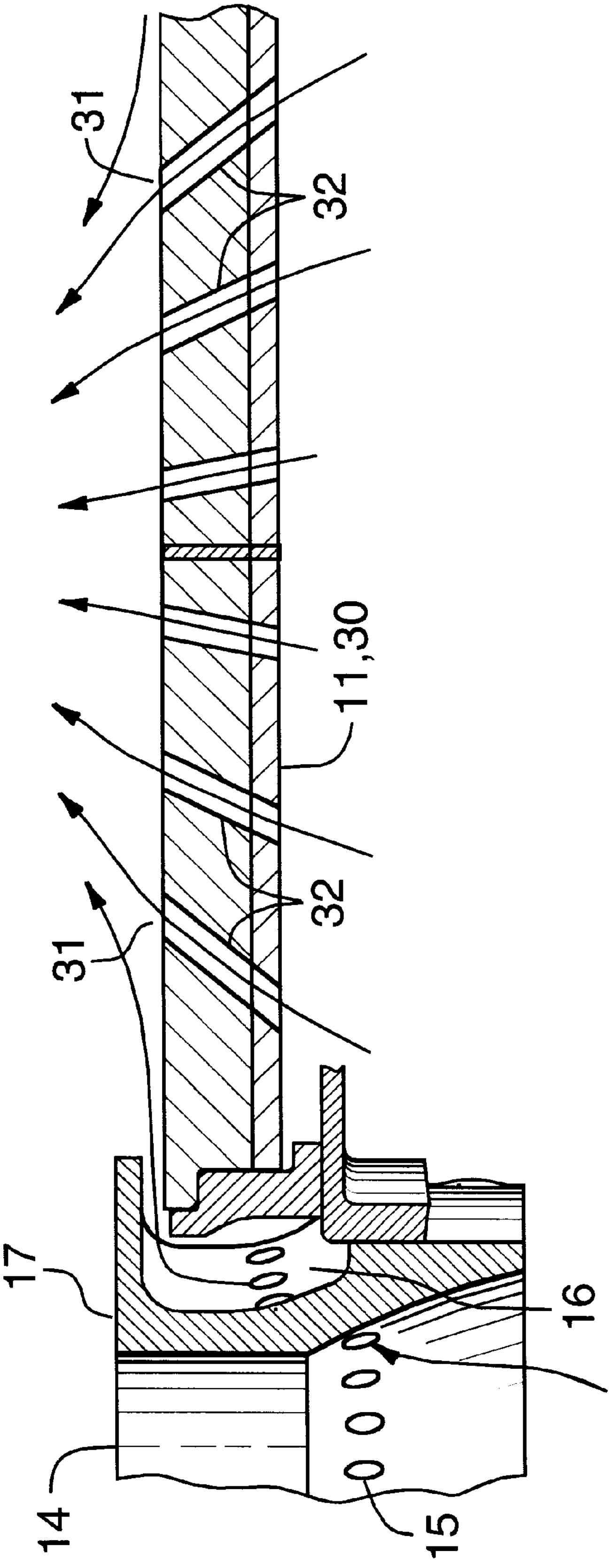
FIG. 9 is a radially outward sectional detail along lines 9—9 of FIG. 8 showing a section through the louver strip and nozzle cup along the median line with angularly directed effusion cooling bores for cooling the exposed top surface of the louvre flange.

In the alternate embodiment shown in FIGS. 8 and 9, angularly directed effusion cooling bores 32 with ports 31 along the median line 13 provide cooling jets exiting along the hot side of the louvre flange 19 and form a cooling film. The jets exiting from ports 31 are in opposite directions so as to move the cooling film away from the nozzle flange 17 as indicated with arrows in FIG. 9. This alternate design eliminates the need for flange cooling scoops 28 on the hot side of the louvre flange 19.

Although the above description and accompanying drawings relate to a specific preferred embodiment as presently contemplated by the inventors, it will be understood that the invention in its broad aspect includes mechanical and functional equivalents of the elements described and illustrated.

The embodiments of the invention in which an exclusive property or privilege is claimed are defined as follows:

1. In an annular gas turbine engine combustion chamber with a dome wall including an annular array of spaced apart fuel nozzles projecting therethrough, a centre point of each nozzle disposed on a circular median line of the annular dome wall, and including a like array of annular nozzle cup means for ducting cool compressed air from an outer surface of the dome wall into a cooling compressed air film in contact with an inner surface of the dome wall, like air films radiating in a direction outwardly from the centre point of each nozzle, the nozzle cup means comprising an annular cup encircling each nozzle and mounted through the dome wall, the improvement comprising:

an array of elongate louver strips, each disposed symmetrically along said median line on the inner surface dome wall and extending between each nozzle cup of the annular array, each strip including:

an elongate flange extending into the combustion chamber from the inner dome wall, the flange having an inner surface and lateral side walls;

compressed air outlet means, disposed along each flange lateral side wall, for directing a compressed air film along the inner surface of the dome wall in a direction away from the median line;

a compressed air inlet in the outer surface of the dome wall and in communication with the outlet means; and flange cooling jet means disposed along the inner surface of the flange, for directing a flow of cooling air over the flange inner surface, the air jet means in communication with the compressed air inlet.

2. A louver strip according to claim 1 wherein the compressed air inlet comprises two back-to-back elongate accumulation chambers each in exclusive communication with one of the compressed air outlet means, the air inlet further comprising a plurality of inlet orifices extending between each accumulation chamber and the outer surface of the dome wall.

3. A louver strip according to claim 1 wherein the flange cooling jet means comprise a plurality of scoops aligned along the median line, and the compressed air inlet further comprises a like plurality of inlet bores communicating between each scoop and the outer surface of the dome wall.

4. A louver strip according to claim 3 wherein each scoop has an opening directed toward a midpoint in the median line between adjacent nozzles.

5. A louver strip according to claim 1 wherein the flange cooling jet means comprise a plurality of circumferentially spaced apart effusion cooling ports disposed along the median line, and the compressed air inlet further comprises a like plurality of effusion cooling bores communicating between each effusion cooling port and the outer surface of the dome wall, the effusion cooling bores each being directed at an acute angle relative to the inner surface of the louvre flange and toward a midpoint in the median line between adjacent nozzles.

6. A louver strip according to claim 1 wherein the louver strip comprises:

a recessed trough in the inner surface of the dome wall having lateral sides, the compressed air inlet including air inlet passages in the trough lateral sides to the outer surface of the dome wall; and a transverse web having an inner edge connected to the flange and an outer edge connected to the trough, the web including two lateral grooves in communication with compressed air outlets defining two back-to-back elongate compressed air accumulation chambers.

* * * * *